(12) United States Patent
Li et al.

(10) Patent No.: US 11,802,227 B2
(45) Date of Patent: Oct. 31, 2023

(54) SOLVENT-BASED ADHESIVE COMPOSITIONS

(71) Applicants: Dow Global Technologies LLC, Midland, MI (US); Rohm and Haas Company, Collegeville, PA (US)

(72) Inventors: Wenwen Li, Pearland, TX (US); Joseph J. Zupancic, Glen Ellyn, IL (US); William J. Harris, Lake Jackson, TX (US); Paul G. Clark, Midland, MI (US); Thorsten Schmidt, Richterswil (CH)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 892 days.

(21) Appl. No.: 16/620,805

(22) PCT Filed: Apr. 24, 2018

(86) PCT No.: PCT/US2018/028993
§ 371 (c)(1),
(2) Date: Dec. 9, 2019

(87) PCT Pub. No.: WO2018/226320
PCT Pub. Date: Dec. 13, 2018

(65) Prior Publication Data
US 2020/0199423 A1 Jun. 25, 2020

Related U.S. Application Data

(60) Provisional application No. 62/517,439, filed on Jun. 9, 2017.

(51) Int. Cl.
| | | |
|---|---|---|
| *C09J 175/06* | (2006.01) |
| *B32B 7/12* | (2006.01) |
| *B32B 15/085* | (2006.01) |
| *B32B 15/09* | (2006.01) |
| *B32B 15/095* | (2006.01) |
| *B32B 27/32* | (2006.01) |
| *B32B 27/36* | (2006.01) |
| *B32B 27/38* | (2006.01) |
| *B32B 27/08* | (2006.01) |
| *B32B 27/40* | (2006.01) |
| *C08L 75/06* | (2006.01) |
| *C08G 18/32* | (2006.01) |
| *C08G 18/58* | (2006.01) |
| *C08G 63/16* | (2006.01) |
| *C08G 63/91* | (2006.01) |

(Continued)

(52) U.S. Cl.
CPC .............. *C09J 175/06* (2013.01); *B32B 7/12* (2013.01); *B32B 15/085* (2013.01); *B32B 15/09* (2013.01); *B32B 15/095* (2013.01); *B32B 27/08* (2013.01); *B32B 27/32* (2013.01); *B32B 27/36* (2013.01); *B32B 27/38* (2013.01); *B32B 27/40* (2013.01); *C08L 75/06* (2013.01); *B32B 2250/02* (2013.01); *C08G 18/3228* (2013.01); *C08G 18/581* (2013.01); *C08G 63/16* (2013.01); *C08G 63/91* (2013.01); *C08K 3/32* (2013.01); *C08K 5/06* (2013.01); *C08K 2003/329* (2013.01)

(58) Field of Classification Search
CPC ......... B32B 7/12; B32B 15/085; B32B 15/09; B32B 15/095; B32B 27/32; B32B 27/36; B32B 27/38; B32B 27/08; B32B 27/40; B32B 2250/02; C08G 18/3228; C08G 18/581; C08G 63/16; C08G 63/91; C08K 3/32; C08K 5/06; C08K 2003/329; C08L 75/06; C08J 175/06
See application file for complete search history.

(56) References Cited

U.S. PATENT DOCUMENTS

| | | |
|---|---|---|
| 4,734,303 A | 3/1988 | Fujiwara et al. |
| 5,144,824 A | 9/1992 | Kobayashi et al. |

(Continued)

FOREIGN PATENT DOCUMENTS

| | | | |
|---|---|---|---|
| JP | 2006082365 A | * | 3/2006 |
| WO | 2016077355 A1 | | 5/2016 |

OTHER PUBLICATIONS

Machine translation of JP 2006-082365 A (Year: 2006).*

(Continued)

*Primary Examiner* — Patrick D Niland
(74) *Attorney, Agent, or Firm* — Boyle Fredrickson, S.C.

(57) ABSTRACT

Solvent-based adhesive composition are disclosed, the compositions comprising (A) a polyester-urethane resin, (B) an epoxy-terminated polyester compound, (C) a phosphoric acid, and (D) an aliphatic isocyanate curing agent. Methods for preparing a solvent-based adhesive composition, the methods comprising providing a polyester-urethane resin, providing an epoxy-terminated polyester compound, mixing the polyester-urethane resin, epoxy-terminated polyester compound, and phosphoric acid to form a resin mixture, diluting the resin mixture in a solvent to form a diluted resin mixture having an application solid content from 25 to 55 weight percent, based on the total weight of the diluted resin mixture, and curing the diluted resin mixture with an aliphatic isocyanate curing agent at a mix ratio (parts by weight resin mixture before dilution:parts by weight aliphatic isocyanate curing agent) of from 100:1 to 100:12. Laminates prepared comprising the solvent-based adhesives and according to the disclosed methods are also disclosed.

18 Claims, No Drawings

(51) Int. Cl.
    *C08K 3/32*           (2006.01)
    *C08K 5/06*           (2006.01)

(56) References Cited

U.S. PATENT DOCUMENTS

| | | |
|---|---|---|
| 5,202,391 A | 4/1993 | Yamazaki et al. |
| 5,360,649 A | 11/1994 | Sato et al. |
| 6,022,913 A | 2/2000 | Tanaka et al. |
| 6,238,783 B1 | 5/2001 | Komai et al. |
| 2009/0011274 A1* | 1/2009 | Ogata .................. C09D 167/00 428/626 |

OTHER PUBLICATIONS

PCT/US2018/028993, International Search Report and Written Opinion dated Jul. 11, 2018.
PCT/US2018/028993, International Preliminary Report on Patentability dated Dec. 19, 2019.

* cited by examiner

SOLVENT-BASED ADHESIVE COMPOSITIONS

REFERENCE TO RELATED APPLICATIONS

The present application claims the benefit of U.S. Provisional Application No. 62/517,439, filed on Jun. 9, 2017.

FIELD OF THE DISCLOSURE

The instant disclosure relates to solvent-based adhesive compositions. More particularly, the disclosure relates to solvent-based adhesive compositions for use in, for example, high-performance laminating adhesive applications, the compositions exhibiting improved adhesion to metal structures, such as foil, and improved heat and chemical resistance. The solvent-based adhesive compositions include a polyester-urethane resin modified with an epoxy-terminated polyester compound, a phosphoric acid, and an aliphatic isocyanate curing agent. The disclosure further relates to methods for preparing such solvent-based adhesive compositions.

BACKGROUND AND SUMMARY OF THE DISCLOSURE

Adhesive compositions are useful for a wide variety of purposes. For instance, some adhesives are used to adhere layers of substrates together, thereby forming laminate structures comprising two or more substrate layers. Flexible packaging laminating adhesives are applied between laminating films for packaging of foodstuffs, pharmaceuticals, and industrial consumables. Laminating adhesives can be classified generally into three categories: (1) solvent-based laminating adhesives, (2) solventless laminating adhesives, and (3) water-based laminating adhesives. Within the solvent-based category, solvent-based polyurethane has been widely used to achieve relatively good heat, moisture, and chemical resistance.

Solvent-based adhesive compositions can be used in high-performance laminate applications (e.g., retort, hot-fill, boil-in-bag, etc.). In order to achieve the high performance required for such applications, polyester systems including epoxidized bisphenol-A are commonly used. The use of bisphenol-A epoxy resins has recently encountered regulatory and user challenges regarding the perceived safety of bisphenol-A-based materials for food packaging.

Accordingly, bisphenol-A-free adhesive compositions suitable for high-performance applications, particularly for use in laminate structures used in high performance applications, are desirable.

Solvent-based adhesive compositions are disclosed herein. In some embodiments, the solvent-based adhesive compositions include a first part comprising (A) a polyester-urethane resin, (B) an epoxy-terminated polyester compound, and (C) a phosphoric acid, and second part comprising (D) an aliphatic isocyanate curing agent. The isocyanate curing agent (D) of the second part crosslinks the components of the first part. In some embodiments, the epoxy-terminated polyester compound has the structure (I):

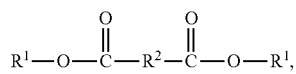

wherein $R^1$— has the structure (II):

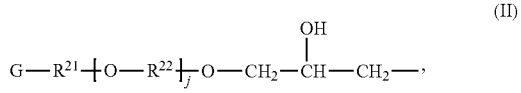

wherein G- has the structure (III):

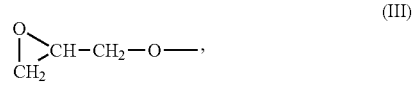

and
wherein j is 0 to 5, —$R^2$— is a divalent organic group, —$R^{21}$— is a divalent alkyl group, and —$R^{22}$— is a divalent alkyl group.

Methods for preparing solvent-based adhesive compositions are also disclosed. The methods include providing a polyester-urethane resin, providing an epoxy-terminated polyester compound, mixing the polyester-urethane resin, epoxy-terminated polyester compound, and phosphoric acid to form a resin mixture, diluting the resin mixture in a solvent to form a diluted resin mixture having an application solid content from 25 to 55 weight percent, based on the total weight of the diluted resin mixture, and curing the diluted resin mixture with an aliphatic isocyanate curing agent at a mix ratio (parts by weight resin mixture before dilution:parts by weight aliphatic isocyanate curing agent) of from 100:1 to 100:12.

The disclosed adhesive compositions are bisphenol-A-free and are suitable for use in, among other things, laminate structures used in high-performance food packaging applications, such as retort applications, hot-fill applications, and boil-in-bag applications. The disclosed adhesive compositions are particularly suitable for laminate structures used in high performance applications.

DETAILED DESCRIPTION OF THE DISCLOSURE

The solvent-based adhesive compositions disclosed herein are suitable for use in laminate structures comprising two or more flexible or rigid substrates. In some embodiments, the substrates can include low or medium density plastics (e.g., of a type selected from polystyrene, polyethylene, ABS, polyurethane, polyethylene terephthalate, polybutylene terephthalate, polypropylene, polyphenylene, polycarbonate, polyacrylate, polyvinyl chloride, polysulfone or mixtures thereof), paper, wood and reconstituted wood products, polymer coated substrates, wax coated paperboard, cardboard, particle board, textiles, leather, and metal (e.g., aluminum, ferrous as well as other non-ferrous), metallized plastics (e.g., metallized plastic film) or the like. In some embodiments, laminate structures prepared using the disclosed solvent-based adhesive compositions can comprise multiple layers/substrates, each layer/substrate being any one of the materials described herein, and the like.

The adhesive compositions are particularly suitable for use in laminate structures subjected to retort processing (e.g., exposure to temperatures of 120° C. or higher for 30 or more minutes), hot-fill processing (e.g., exposure to temperatures of 66° C. or higher for 30 or more minutes), and boil-in-bag processing (e.g., exposure to temperatures of 100° C. or higher for 30 or more minutes) (i.e., high performance applications). In some embodiments, the solvent-based adhesive compositions can be used in metal food packaging applications such as deep drawn cans and containers with metal lidding or flexible heat seal lidding. In some embodiments, the solvent-based adhesive compositions can be used in food pouches, ready-to-eat meals, can coatings, etc.

In some embodiments, the solvent-based adhesive compositions include a first part comprising (A) a polyester-urethane resin, (B) an epoxy-terminated polyester compound, and (C) a phosphoric acid, and second part comprising (D) an aliphatic isocyanate curing agent. The aliphatic isocyanate curing agent (D) of the second part crosslinks the components of the first part, thereby generating a polyester-urethane-polyurethane polymer network. The polyester-urethane resin (A) and the epoxy-terminated polyester compound (B) react with the aliphatic isocyanate curing agent (D) through reaction between the hydroxyl groups with the isocyanate functionality to generate a homogeneous polyester-urethane-polyurethane network.

The two parts of the disclosed adhesive compositions are mixed prior to contacting a substrate (such as when applied on a laminating machine). The mixed adhesive is applied to one substrate and dried before another layer of substrate is applied. The laminate can then be cured at ambient temperature or elevated temperature.

First Part: (A) Polyester-Urethane Resin

In some embodiments, the solvent-based adhesive compositions include a first part comprising (A) a polyester-urethane resin. In some embodiments, the polyester-urethane resin is a hydroxy-terminated polyurethane resin. Suitable hydroxy-terminated polyurethane resins can be prepared through the reaction of an isocyanate (e.g., a monomeric isocyanate and/or a polyisocyanate) and a polyester polyol. As used herein, a "polyisocyanate" is any compound that contains two or more isocyanate groups. For example, polyisocyanates may include dimers, trimers, etc. In such a reaction, the polyester polyol is present in excess in order to produce a hydroxy-terminated polyurethane resin, in other words, the stoichiometric ratio of hydroxyl groups to isocyanate groups should be higher than 1.

Suitable isocyanates for use according to this disclosure include, but are not limited to, aromatic isocyanates, aliphatic isocyanates, cycloaliphatic isocyanates, and combinations of two or more thereof. An "aromatic isocyanate" is an isocyanate that has an isocyanate radical bonded to an aromatic radical and contains one or more aromatic rings. An "aliphatic isocyanate" contains an isocyanate radical bonded to an aliphatic radical which can be bonded to other aliphatic groups, a cyclo-aliphatic radical or an aromatic ring (radical). A "cycloaliphatic isocyanate" is a subset of aliphatic isocyanates, wherein the chemical chain is ring-structured.

Suitable aromatic isocyanates include, but are not limited to, 1,3- and 1,4-phenylene diisocyanate, 1,5-naphthylene diisocyanate, 2,6-tolulene diisocyanate ("2,6-TDI"), 2,4-tolulene diisocyanate ("2,4-TDI"), 2,4'-diphenylmethane diisocyanate ("2,4'-MDI"), 4,4'-diphenylmethane diisocyanate ("4,4'-MDI"), 3,3'-dimethyl-4,4'-biphenyldiisocyanate ("TODI"), and mixtures of two or more thereof.

Suitable aliphatic isocyanates have 3 to 16 carbon atoms, or 4 to 12 carbon atoms, in the linear or branched alkylene residue, such as hexamethylene diisocyanate ("HDI"), 1,4-Diisocyanatobutane, 1,3-xylylene diisocyanate ("1,3-XDI"), and 1,4-xylylene diisocyanate ("1,4-XDI"). Suitable cycloaliphatic isocyanates have 4 to 18 carbon atoms, or 6 to 15 carbon atoms, in the cycloalkylene residue. Cycloaliphatic diisocyanates refer to both cyclically and aliphatically bound NCO groups, such as isophorone diisocyanate ("IPDI"), 1,3-/1,4-diisocyanatocyclohexane 1,3-/1,4-bis(isocyanatomethyl)cyclohexane, and diisocyanatodicyclohexylmethane ("$H_{12}$MDI").

Suitable aliphatic and cycloaliphatic isocyanates include, but are not limited to, cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate ("TIN"), decane di- and triisocyanate, undecane di- and triisocyanate and dodecane di- and triisocyanate, isophorone diisocyanate ("IPDI"), hexamethylene diisocyanate ("HDI"), diisocyanatodicyclohexylmethane ("$H_{12}$MDI"), 2-methylpentane diisocyanate ("MPDI"), 2,2,4-trimethyl-hexamethylene diisocyanate/2,4,4-trimethylhexamethylene diisocyanate ("TMDI"), norbornane diisocyanate ("NBDI"), xylylene diisocyanate ("XDI"), tetramethylxylylene diisocyanate, and dimers, trimers, and mixtures of the of two or more thereof.

Additional isocyanates suitable for use according to this disclosure include, but are not limited to, 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methyl-pentane, and mixtures of the of two or more thereof.

As used herein, "polyol" refers to a compound having two or more hydroxy groups (i.e., —OH) per molecule. As used herein, "ester" refers to a compound that contains an ester linkage. As used herein, "polyester" refers to a compound that contains three or more ester linkages per molecule. A compound that is both a polyester and a polyol is a "polyester polyol." An aliphatic polyester polyol is a polyester polyol that contains no aromatic ring in its molecule. An aromatic polyester polyol is a polyester polyol that contains one or more aromatic rings in its molecule.

In some embodiments, the polyester-urethane resin accounts for from 65 to 99.5 percent by weight of the total weight of the polyester-urethane resin (A), the epoxy-terminated polyester compound (B), and the phosphoric acid (C). In some embodiments, the polyester-urethane resin accounts for from 95 to 99 percent by weight of the total weight of the polyester-urethane resin (A), the epoxy-terminated polyester compound (B), and the phosphoric acid (C).

Commercially available examples of polyester-urethane resins suitable for use according to this disclosure include ADCOTE™ 811A EA, available from The Dow Chemical Company.

First Part: (B) Epoxy-Terminated Polyester Compound

In some embodiments, the solvent-based adhesive compositions include a first part comprising (B) an epoxy-terminated polyester compound. Without being bound to theory, it is thought that the epoxide functionality of the epoxy-terminated polyester compound (B) reacts with phosphoric acid (C) present in the adhesive composition, as discussed herein, to generate epoxy phosphate esters which are capable of complexing with reactive sites on metal films, metal oxide coated films, and/or polymer films, thereby improving adhesion. Further, the epoxide functionality of the epoxy-terminated polyester reacts/complexes with reactive sites on metal films, metal oxides, or plastic films, and/or undergoes secondary reactions with amines, hydroxyl groups, and/or carboxylic acid groups present in the adhesive compositions.

In some embodiments, epoxy-terminated polyester compounds (B) suitable for use according to this disclosure have the structure (I):

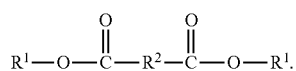
(I)

In structure (I), the two —$R^1$— groups may be identical or different. Each $R^1$ group has the structure (II):

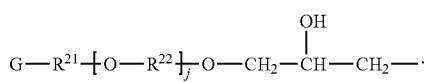
(II)

The group —$R^2$— is a divalent organic group. The group G- has the structure III:

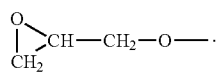
(III)

The number j is 0 to 5. The group —$R^{21}$— is a divalent alkyl group. The group —$R^{22}$— is a divalent alkyl group.

In some embodiments, the epoxy-terminated polyester may also contain, in addition to one or more compounds having structure I, one or more compounds having structure (IV):

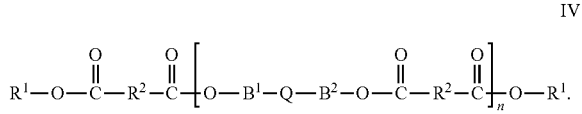
IV

In structure IV, —$B^1$— has the structure (V):

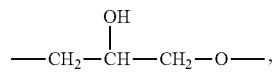
V

—$B^2$— has the structure (VI)

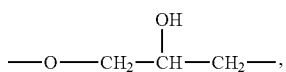
(VI)

and
-Q- has the structure (VII):

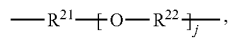
(VII)

wherein j is 0 to 5, and n is 1 to 6. The group —$R^{21}$— is a divalent alkyl group. The group —$R^{22}$— is a divalent alkyl group.

In some embodiments, —$R^2$— is a group having structure (VIII):

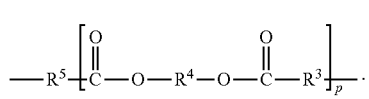
(VIII)

In some embodiments, p is 0 to 20, or 0 to 10, or 0 to 5. Each —$R^3$—, each —$R^4$—, and each —$R^5$— is, independent of the other, a divalent organic group. Within a single —$R^2$— group, if p is 2 or greater, the various —$R^3$— groups may be identical to each other or different from each other. Within a single —$R^2$— group, if p is 2 or greater, the various —$R^4$— groups may be identical to each other or different from each other.

In some embodiments, —$R^3$— is selected from one or more divalent aliphatic groups, one or more divalent aromatic hydrocarbon groups, or a mixture thereof. Suitable aliphatic groups include, but are not limited to, alkyl groups, including linear or branched alkyl groups, further including linear alkyl groups. Among aliphatic groups, preferred are those with 1 or more carbon atoms; more preferred are those with 2 or more carbon atoms; more preferred are those with 3 or more carbon atoms. Among aliphatic groups, preferred are those with 12 or fewer carbon atoms; more preferred are those with 8 or fewer carbon atoms; more preferred are those with 6 or fewer carbon atoms. Among aliphatic groups, preferred is —$CH_2CH_2CH_2CH_2$—. Among aromatic groups, preferred are those with the structure (IX):

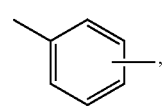
(IX)

including mixtures of isomers, including that of structure (X):

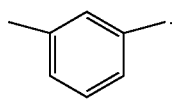
(X)

The groups that are suitable and preferred for —$R^5$— are the same as those for —$R^3$—. The group —$R^5$— may be different from all of the —$R^3$— groups, or —$R^5$— may be the same as one or all of the —$R^3$— groups.

In some embodiments, —$R^4$— is either an aliphatic group or is an aliphatic ether group. An aliphatic ether group has the structure (XI):

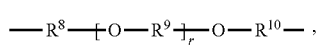
(XI)

where —$R^8$— and —$R^9$— (if present) and —$R^{10}$— are aliphatic groups, and where r is 0 to 10. The groups —$R^8$— and —$R^9$— (if present) and —$R^{10}$— may be identical or may be different from each other. When —$R^4$— is an aliphatic ether group, the following preferences apply to —$R^8$—, —$R^9$— (if present), —$R^{10}$—, and r. In some embodiments, —$R^8$— and —$R^9$— (if present) and —$R^{10}$— are identical. In some embodiments, —$R^8$— and —$R^9$— (if present) and —$R^{10}$— are linear or branched alkyl groups. In some embodiments, —$R^8$— and —$R^9$— (if present) and —$R^{10}$— each have 4 or fewer carbon atoms, or 3 or fewer carbon atoms, or exactly 2 carbon atoms. In some embodiments, r is 0 to 10, or 0 to 5, or 0 to 2, or 0. When —$R^4$— is an aliphatic group, —$R^4$— is preferably an alkyl group; more preferably a linear alkyl group or a substituted cyclic aliphatic group. When —$R^4$— is an aliphatic group, —$R^4$— has 1 or more carbon atoms. When —$R^4$— is an aliphatic group, —$R^4$— preferably has 12 or fewer carbon atoms, or 8 or fewer carbon atoms, or 4 or fewer carbon atoms, or exactly 2 carbon atoms.

In some embodiments of structure II, j is 0 or more. In some embodiments of structure II, j is 5 or less, or 4 or less, or 3 or less, or 2 or less, or 1 or less.

In some embodiments of structure II, —$R^{21}$— is a divalent alkyl group. In some embodiments of structure II, —$R^{21}$— has 2 or more carbon atoms, or 3 or more carbon atoms. In some embodiments of structure II, —$R^{21}$— has 6 or fewer carbon atoms, or 5 or fewer carbon atoms, or 4 or fewer carbon atoms. In some embodiments of structure II, —$R^{21}$— has exactly 4 carbon atoms.

In some embodiments of structure II, if j is 1 or more, the suitable structures for —$R^{22}$— are the same as those for —$R^{21}$—. The group —$R^{22}$— may be the same as —$R^{21}$— or different from —$R^{21}$—.

In some embodiments, the epoxy-terminated polyester compound is the product of reactants including a diepoxide and a carboxylic acid-terminated polyester. In some embodiments, the carboxylic acid-terminated polyester is the product of reactants including a diol and a (di)carboxylic acid. In some embodiments, the carboxylic acid-terminated polyester has an acid value of 110 or higher, or 120 or higher, or 125 or higher. In some embodiments, the carboxylic acid-terminated polyester has an acid value of 260 or lower, or 200 or lower, or 175 or lower. In some embodiments, the carboxylic acid-terminated polyester has a number-average molecular weight of 430 or higher, or 560 or higher, or 640 or higher. In some embodiments, the carboxylic acid terminated-polyester has a number-average molecular weight of 2,000 or lower, or 1,500 or lower, or 1,200 or lower.

In the reaction of the diepoxide with the dicarboxylic acid-terminated polyester, the stoichiometric ratio of epoxide groups to carboxylic acid groups can be 2:1 to 2:1.4. All individual ranges and subranges between 2:1 and 2:1.4 are included herein.

In some embodiments, the epoxide-terminated polyester has an Epoxide Equivalent Weight ("EEW") of 275 or higher, or 350 or higher, or 400 or higher. In some embodiments, the epoxide-terminated polyester has an EEW of 3,500 or lower, or 2,500 or lower, or 2,000 or lower. In some embodiments, the number-average molecular weight of the epoxy terminated polyester is 500 or higher, or 1,000 or higher. In some embodiments, the number-average molecular weight of the epoxy terminated polyester is 8,000 or lower, or 6,000 or lower, or 3,500 or lower.

Further information about the epoxide terminated polyester and its preparation can be found in PCT Publication No. WO/2015/073965 and WO/2015/073956, which are herein incorporated by reference in its entirety.

In some embodiments, the epoxy-terminated polyester compound accounts for from 0.5 to 35 percent by weight of the total weight of the polyester-urethane resin (A), the epoxy-terminated polyester compound (B), and the phosphoric acid (C). In some embodiments, the epoxy-terminated polyester compound accounts for from 0.5 to 5 percent by weight of the total weight of the polyester-urethane resin (A), the epoxy-terminated polyester compound (B), and the phosphoric acid (C).

First Part: (C) Phosphoric Acid

In some embodiments, the solvent-based adhesive compositions include a first part comprising a phosphoric acid (C). In some embodiments, the phosphoric acid includes pure phosphoric acid, or a phosphoric acid solution (e.g., phosphoric acid diluted in a solvent). In some embodiments, the phosphoric acid (C) is phosphoric acid diluted in ethyl acetate.

In some embodiments, the phosphoric acid accounts for from 0.01 to 0.4 percent by weight of the total weight of the polyester-urethane resin (A), the epoxy-terminated polyester compound (B), and the phosphoric acid (C). In some embodiments, the phosphoric acid accounts for from 0.01 to 0.05 percent by weight of the total weight of the polyester-urethane resin (A), the epoxy-terminated polyester compound (B), and the phosphoric acid (C).

Second Part: (D) Aliphatic Isocyanate Curing Agent

In some embodiments, the solvent-based adhesive compositions include a second part comprising an aliphatic isocyanate curing agent (D). In some embodiments, the polyester-urethane resin (A), the epoxy-terminated polyester compound (B), and the phosphoric acid (C) are combined to form a resin mixture. The resin mixture is diluted in a solvent to form a diluted resin mixture having an application solid content from 25 to 55 weight percent, or from 30 to 45 weight percent, or from 35 to 40 weight percent, based on the total weight of the diluted resin mixture. The diluted resin mixture can then be cured with the aliphatic isocyanate curing agent (D) at a mix ratio (parts by weight resin mixture before dilution:parts by weight aliphatic isocyanate curing agent) of from 100:1 to 100:12.

The isocyanate employed may be any suitable aliphatic isocyanate. Suitable aliphatic isocyanates include, but are not limited to, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate ("TIN"), decane di- and triisocyanate, undecane di- and triisocyanate, dodecane di- and triisocyanate, isophorone diisocyanate ("IPDI"), hexamethylene diisocyanate ("HDI"), diisocyanatodicyclohexylmethane ("$H_{12}$MDI"), 2-methylpentane diisocyanate ("MPDI"), 2,2,4-trimethylhexamethylene diisocyanate/2,4,4-trimethylhexamethylene diisocyanate ("TMDI"), norbornane diisocyanate ("NBDI"), xylylene diisocyanate ("XDI"), tetramethylxylylene diisocyanate, and dimers, trimers, and mixtures of the of two or more thereof.

As gathered from the foregoing, the present disclosure contemplates the employment of two parts, which preferably are mixed using a suitable mixer (e.g., an electrically, pneumatically, or an otherwise powered mechanical mixer) prior to or during application to a substrate to form the adhesive composition. Mixing may take place at any suitable time in the process, such as before, during, or as a result of the application process. All of the present steps may be carried out under ambient room temperature conditions. As desired, heating or cooling may be employed.

Methods for preparing a solvent-based adhesive composition are disclosed herein. In some embodiments, providing a polyester-urethane resin, providing an epoxy-terminated polyester compound, mixing the polyester-urethane resin, epoxy-terminated polyester compound, and phosphoric acid to form a resin mixture, diluting the resin mixture in a solvent to form a diluted resin mixture having an application solid content from 25 to 55 weight percent, or from 30 to 45 weight percent, or from 35 to 40 weight percent, based on the total weight of the diluted resin mixture, and curing the diluted resin mixture with an aliphatic isocyanate curing agent at a mix ratio (parts by weight resin mixture before dilution:parts by weight aliphatic isocyanate curing agent) of from 100:1 to 100:12.

The disclosed adhesive compositions are useful for bonding substrates together. The substrates may be similar materials or dissimilar materials. Wet and dry bond lamination of a plurality of substrate layers is possible. The disclosed adhesive compositions can be applied to desired substrates using conventional application techniques such as rotogravure printing, flexographic printing, roll coating, brush coating, wire wound rod coating, knife coating, or coating processes such as curtain-, flood-, bell-, disc-, and dip-coating processes. Coating with the adhesive compositions may be done over an entire surface or only a portion of it, such as along an edge, or at intermittent locations. Once applied to the substrate, the compositions are dried, such as by application of heat and air flow, or some other suitable approaches for removing substantially all remaining solvent.

The disclosed adhesive compositions can be used on a wide variety of one or a plurality of suitable substrates such as high, low or medium density plastics (e.g., of a type selected from polystyrene, polyethylene, ABS, polyurethane, polyethylene terephthalate, polybutylene terephthalate, polypropylene, polyphenylene, polycarbonate, polyacrylate, polyvinyl chloride, polysulfone or mixtures thereof), paper, wood and reconstituted wood products, polymer coated substrates, wax coated paperboard, cardboard, particle board, textiles, leather, and metal (e.g., aluminum, ferrous as well as other non-ferrous), metallized plastics (e.g., metallized plastic film) or the like. The adhesive compositions are particularly attractive for packaging and sealing applications. For example, a plastic film, metal film, or metallized plastic film can be laminated (e.g., over all or at least a portion of its surface, such as along its edges, or at intermittent locations) with the adhesive compositions of the disclosure. In some embodiments, food may be packaged for boil-in-bag preparation, or the resulting laminate might be used for sealing or packaging some other article. When heavy gauge foil is employed in the laminate structure, the resulting laminate can be cold drawn to yield a cup or package, which can be filled with food and then covered and sealed with a similar laminate structure to form a sealed container.

For the cold drawability and optimum performance of the adhesive system it is critical that the final laminate structure have balanced mechanical properties. The balanced mechanical properties will permit distribution of load and stress across the laminate under fabrication and use conditions for the laminate with temperature variation. The adhesive with the epoxy-terminated polyester enables the laminate to have improved mechanical properties to balance and transfer the load and strain within the laminate structure. The Storage Modulus of the cured neat polyester-urethane-polyurethane with and without the epoxy-terminated polyester additive will be in the range of about 50 to 1,500 MPa at 0° C. and 0.7 to 6.0 MPa at 25° C. and 0.10 to 1.50 MPa at 60° C. The critical performance difference will be in the % elongation observed for the laminate structure as a function of orientation. The % elongation in the machine and transverse direction will be more balanced in both directions being in the range of 6.5 to 10.5% and difference in the machine and transverse direction will be on the order of an absolute value of 0.0 to 0.60%, preferably 0.0 to 0.30%, due to the ability of the epoxy-terminated polyester to interact with the surface of the substrates and help balance the difference in distribution of forces across the laminate structure.

EXAMPLES OF THE DISCLOSURE

The present disclosure will now be described in further detail by discussing Illustrative Examples ("IE") and Comparative Examples ("CE") (collectively "the Examples"). However, the scope of the present disclosure is not, of course, limited to the IEs.

Raw Materials

The Examples are prepared using the pertinent raw materials identified in Table 1:

TABLE 1

| Pertinent Raw Materials | |
|---|---|
| Material | Description |
| ADCOTE ™ 811A EA | Polyester-urethane resin commercially available from The Dow Chemical Company |
| MOR-FREE ™ 200C | Aliphatic isocyanate curing agent commercially available from The Dow Chemical Company |
| Isophthalic acid ("IPA") | Isophthalic acid commercially available from Aldrich |
| Adipic acid ("AA") | Commercially available from Sigma-Aldrich |
| Diethylene glycol ("DEG") | Commercially available from Sigma-Aldrich |
| Ethylene glycol ("EG") | Commercially available from Sigma-Aldrich |
| 1,6-hexanediol ("HDO") | Commercially available from Sigma-Aldrich |
| 1,4-butanediol ("BDO") | Commercially available from Sigma-Aldrich |
| Neopentyl glycol ("NPG") | Commercially available from Sigma-Aldrich |
| Cyclohexane dimethanol ("CHDM") | Commercially available from Sigma-Aldrich |
| Sodium acetate | Commercially available from Sigma-Aldrich |
| D.E.R. ™ 731 | Aliphatic diluent based on 1,4-butanediol diglycidylether commercially available from The Olin |
| ERISYS GE-21 | Epoxidized butanediol commercially available from Emerald Materials |
| FASCAT ™ 9100 | Commercial grade hydroxybutyltin oxide commercially available from Arkema |

The laminate films of the Examples are prepared using the pertinent films identified in Table 2:

TABLE 2

| Pertinent Film Materials | |
|---|---|
| Film | Description |
| Prelam | 12 micrometer (48 gauge) polyester ("PET") film laminated |

TABLE 2-continued

Pertinent Film Materials

| Film | Description |
|---|---|
| | to 0.00035 mil aluminum foil with ADCOTE ™ 550/Coreactant F at 3.26 g/m² (2.00 lbs/ream), commercially available from Dow Chemical Company |
| CPP | Cast polypropylene, thickness 1 or 2 mil. |
| Foil | 1.5 gauge aluminum foil |

Preparation of Carboxylic Acid-Terminated Polyester

Carboxylic acid-terminated polyesters suitable for use in the Examples are synthesized according to the following general procedure, with detailed formulation compositions for various carboxylic acid-terminated polyester samples summarized in Table 3. A dry, 5-liter one-piece reactor equipped with a mechanical stirrer with 0.25" stainless steel stirring assembly, glycol column, distillation head, condenser, receiver, nitrogen purge, and thermocouple is charged with about 1,158.6 grams of isophthalic acid, 720.9 grams of diethylene glycol, 398.3 grams of ethylene glycol, and 0.409 grams of FASCAT™ 9100. The reactor contents are vacuum degassed and nitrogen purged three times, and then slowly heated to about 100° C. Next, the temperature is increased to 225° C. When about 50% of the theoretical amount of water is evolved, the acid value of the contents is monitored. When the acid value is lower than 80, the resin is cooled down to about 150° C. and 1,525.85 grams of adipic acid monomer is added to the reactor and maintained from about 135 to 145° C. for 30 minutes. The reaction temperature is subsequently increased to about 225° C. while monitoring the acid value. The reaction temperature is maintained at about 225° C. until the acid value is lower than 160, applying vacuum as needed. When the acid value is less than or equal to 160, the reaction temperature is cooled to about 160° C. The produced acid-terminated polyester resin (Example 01) is then packaging for later use.

Preparation of Epoxy-Terminated Polyester Compound

Epoxy-terminated polyester compounds suitable for use in the Examples are synthesized according to the following procedure, with detailed formulation compositions for epoxy-terminated polyester compound samples summarized in Table 4. A dry, 2-liter, two piece kettle reactor equipped with mechanical stirrer, condenser, nitrogen purge, and thermocouple is charged with 931.6 grams of acid-terminated polyester resin (Example 01), 696.7 grams of D.E.R.™ 731 and 0.603 grams of sodium acetate catalyst. The resin mixture is slowly heated and then maintained from about 135 to 140° C. for 30 minutes. The temperature is then increased to from about 150 to 155° C. When the reaction exotherms, the temperature is not allowed to exceed from about 160 to 165° C., with the heating mantle removed and external cooling temporarily applied as needed. The resin is maintained at from about 150 to about 155° C. for 1.5 to 2 hours, with the acid value monitored. The resin is maintained at from about 150 to about 155° C. until the acid value is lower than 1, then the resin is cooled to about 60 to about 65° C., and 837.9 grams of ethyl acetate is slowly added to the resin. The mixture is maintained at from about 60 to 65° C. for another 30 minutes, then the formed epoxy-terminated polyester resin (Example 09) is discharged.

In one example, 99.95 grams of epoxy-terminated polyester resin (Example 09) is mixed 0.05 grams of stannous octoate catalyst in a glass jar, forming another epoxy-terminated polyester resin containing catalyst (Example 09a), which is used in certain examples.

Compositions of these acid-terminated polyester and epoxy-terminated polyester compounds are summarized in Table 3 and Table 4.

Acid Value (AV) is measured by the method of ASTM D3655-06 (American Society for Testing and Materials, West Conshohocken, Pa., USA).

Epoxy Equivalent Weight (EEW) is measured by the method of ASTM D1652-11 (American Society for Testing and Materials, West Conshohocken, Pa., USA).

Size Exclusion Chromatography (SEC) used two PLgel Mix-B and PLgel Mixed-D columns and Viscotek's triple detector. Polystyrene standards were used to establish a universal calibration curve that determines the weight-averaged and number-averaged molecular weights. The sample was diluted with THF to a polymer concentration of approximately 2.5 mg/ml prior to analysis.

Viscosity for 100% solid resins is measured by employing a Cone and Plate viscometer is CAP 2000+L with a spindle #3, speed 100 rpm and varying the temperature over a range of 25 to 70° C.

Solution viscosity is measured with a Brookfield viscometer according to method ASTM D2196-10 (ASTM, West Conshohocken, Pa., USA).

TABLE 3

Carboxylic Acid-Terminated Polyester Compositions

| Monomer Wt Charges (g) | Example 01 | Example 02 | Example 03 | Example 04 | Example 05 | Example 06 | Example 07 | Example 08 |
|---|---|---|---|---|---|---|---|---|
| Backbone | DEG & EG | NPG & DEG | CHDM & DEG | HDO & NPG | HDO & CHDM | BDO & EG | CHDM & BDO | NPG & BDO |
| Isophthalic Acid | 1158.60 | 1158.60 | 1158.60 | 1158.600 | 1158.600 | 1158.60 | 1158.60 | 1158.60 |
| Diethylene Glycol (DEG) | 720.9 | 703.816 | 688.273 | — | — | — | — | — |
| Ethylene Glycol (EG) | 398.3 | — | — | — | — | — | 402.4 | — |
| 1,4-Cyclohexanedimethanol (CHDM) | — | — | 883.188 | — | 877.033 | — | 891.56 | — |
| Neopentyl Glycol (NPG) | — | 652.264 | — | 647.616 | — | — | — | 658.88 |
| 1,6-Hexanediol (HDO) | — | — | — | 777.918 | 760.857 | — | — | — |
| 1,4-Butanediol (BDO) | — | — | — | — | — | 618.0 | 589.26 | 602.97 |

TABLE 3-continued

Carboxylic Acid-Terminated Polyester Compositions

| Monomer Wt Charges (g) | Example 01 | Example 02 | Example 03 | Example 04 | Example 05 | Example 06 | Example 07 | Example 08 |
|---|---|---|---|---|---|---|---|---|
| Adipic Acid | 1525.850 | 1525.850 | 1525.850 | 1525.850 | 1525.850 | 1525.8 | 1525.8 | 1525.8 |
| FASCAT ™ 9100 | 0.409 | 0.409 | 0.409 | 0.409 | 0.409 | 0.409 | 0.409 | 0.409 |

TABLE 4

Epoxy-Terminated-Polyester Compositions

| Monomer/ Intermediate | Example 09 | Example 10 | Example 11 | Example 12 | Example 13 | Example 14 | Example 15 | Example 16 |
|---|---|---|---|---|---|---|---|---|
| D.E.R. ™ 731 or ERISYS GE21 | 696.7 | 379.09 | 394.36 | 381.94 | 387.01 | 357 | 346.6 | 355.7 |
| Example 01 | 931.6 | | | | | | | |
| Example 02 | | 504.70 | | | | | | |
| Example 03 | | | 563.70 | | | | | |
| Example 04 | | | | 528.10 | | | | |
| Example 05 | | | | | 539.70 | | | |
| Example 06 | | | | | | 502.3 | | |
| Example 07 | | | | | | | 492.5 | |
| Example 08 | | | | | | | | 494.1 |
| Sodium Acetate | 0.603 | 0.3700 | 0.3768 | 0.3730 | 0.3730 | 0.368 | 0.357 | 0.366 |
| Ethyl Acetate | 837.9 | 499.95 | 516.10 | 490.00 | 499.00 | 462.9 | 452.0 | 457.8 |

Typical properties of these acid-terminated polyesters and epoxy-terminated polyester compounds are summarized in Table 5 and Table 6.

TABLE 5

Carboxylic Acid-Terminated Polyester Characterization Results

| | Example 01 | Example 02 | Example 03 | Example 04 | Example 05 | Example 06 | Example 07 | Example 08 |
|---|---|---|---|---|---|---|---|---|
| Backbone | DEG & EG | NPG & DEG | CHDM & DEG | HDO & NPG | HDO & CHDM | BDO & EG | CHDM & BDO | NPG & BDO |
| Appearance | semi-solid | semi-solid | semi-solid | semi-solid | semi-solid | semi-solid | semi-solid | semi-solid |
| Gardner Color | white | white | white | white | white | white | white | white |
| AV (Final) | 153.0 | 159.0 | 148.0 | 153.0 | 151.0 | 159.8 | 158.2 | 161.7 |
| Viscosity @ 70° C. (cps) | | 2707 | 7043 | 3540 | 9750 | 1980 | 11175 | 3368 |
| SEC | | | | | | | | |
| Mn | 650 | 835.0 | 944.0 | 915.0 | 999.0 | 756 | 902 | 821 |
| Mw | 1550 | 1415.0 | 1723.0 | 1678.0 | 1929.0 | 1207 | 1554 | 1365 |
| Mz | 2650 | 2136.0 | 2769.0 | 2677.0 | 3213.0 | 1744 | 2414 | 2905 |
| Polydispersity | 2.38 | 1.69 | 1.82 | 1.83 | 1.93 | 1.61 | 1.72 | 1.66 |
| <500 Daltons | 19.2% | 14.4% | 12.8% | 13.0% | 12.2% | 16.0% | 15.5% | 16.7% |
| <1000 Daltons | 42.8% | 35.8% | 32.8% | 33.2% | 31.9% | 49.9% | 39.6% | 40.4% |

TABLE 6

Epoxy-terminated polyester compound Characterization Results

| Sample | Example 09 | Example 10 | Example 11 | Example 12 | Example 13 | Example 14 | Example 15 | Example 16 |
|---|---|---|---|---|---|---|---|---|
| Appearance | Liquid | Liquid | Liquid | Liquid | Liquid | Liquid | Liquid | Liquid |
| Gardner Color | colorless | colorless | colorless | light yellow | light yellow | light yellow | light yellow | light yellow |

TABLE 6-continued

Epoxy-terminated polyester compound Characterization Results

| Sample | Example 09 | Example 10 | Example 11 | Example 12 | Example 13 | Example 14 | Example 15 | Example 16 |
|---|---|---|---|---|---|---|---|---|
| ASTM Solid (%) | 64% | 64% | 65% | 64% | 64% | 65.5% | 65.8% | 65.6% |
| AV (Final) | <0.1 | <<1 | <<1 | 0.65 | 0.04 | 0.3 | 0.2 | 0.2 |
| EEW (Actual) | 1353 | 1056 | 1121 | 1258 | 1236 | 1279 | 1343 | 1304 |
| Visc (cps) @ 20 C. | | 194.4 | 320 | 235.2 | 302.4 | 226 | 586 | 334 |
| SEC | | | | | | | | |
| Mn | 1850 | 1128 | 1274 | 1331 | 1365 | 1385 | 1511 | 1434 |
| Mw | 30000 | 20182 | 20171 | 10539 | 11502 | 6443 | 36486 | 23222 |
| Mz | 186550 | 196703 | 174835 | 54053 | 60220 | 17930 | 311354 | 187605 |
| Polydispersity | 16.2 | 17.9 | 15.84 | 7.92 | 8.42 | 4.65 | 24.15 | 16.19 |
| <500 Daltons | 6.4% | 9.9% | 9.2% | 7.8% | 8.0% | 7.2% | 8.1% | 8.2% |
| <1000 Daltons | 14.1% | 20.1% | 14.9% | 13.0% | 13.1% | 14.6% | 12.9% | 14.4% |

Preparation of Polyester-Urethane/Epoxy-Terminated Polyester Compound Blend

ADCOTE™ 811A EA with 1 or 2% epoxy-terminated polyester compound incorporated is prepared in two-steps. In the first step, the epoxy-terminated polyester compound is mixed with ADCOTE™ 811A EA. In the second step, additional phosphoric acid is incorporated into the mixture. Detailed compositions for the polyester-polyurethane/ET-polyester blends are summarized in Table 7 and Table 8.

TABLE 7

Polyester-Urethane/Epoxy-terminated polyester compound Blends

| | Example 17 | Example 18 | Example 19 | Example 20 | Example 21 | Example 22 | Example 23 | Example 24 |
|---|---|---|---|---|---|---|---|---|
| ADCOTE™ 811 A EA | 247.5 | 245 | 247.5 | 245 | 247.5 | 245 | 247.5 | 245 |
| Example 09a | 2.5 | 5 | | | | | | |
| Example 10 | | | 2.5 | 5 | | | | |
| Example 11 | | | | | 2.5 | 5 | | |
| Example 12 | | | | | | | 2.5 | 5 |
| Phosphoric acid stock solution* | 0.29 | 0.29 | 0.29 | 0.29 | 0.29 | 0.29 | 0.29 | 0.29 |
| Total | 250.29 | 250.29 | 250.29 | 250.29 | 250.29 | 250.29 | 250.29 | 250.29 |
| ET-polyester loading level | 1.0% | 2.0% | 1.0% | 2.0% | 1.0% | 2.0% | 1.0% | 2.0% |

*1.5 g of 85% phosphoric acid solution diluted in 10 g of ethyl acetate

TABLE 8

Polyester-Urethane/Epoxy-terminated polyester compound Blends

| | Example 25 | Example 26 | Example 27 | Example 28 | Example 29 | Example 30 | Example 31 | Example 32 |
|---|---|---|---|---|---|---|---|---|
| ADCOTE™ 811 A EA | 247.5 | 245 | 247.5 | 245 | 247.5 | 245 | 247.5 | 245 |
| Example 13 | 2.5 | 5 | | | | | | |
| Example 14 | | | 2.5 | 5 | | | | |
| Example 15 | | | | | 2.5 | 5 | | |
| Example 16 | | | | | | | 2.5 | 5 |
| Phosphoric acid stock solution* | 0.29 | 0.29 | 0.29 | 0.29 | 0.29 | 0.29 | 0.29 | 0.29 |
| Total | 250.29 | 250.29 | 250.29 | 250.29 | 250.29 | 250.29 | 250.29 | 250.29 |
| ET-polyester loading level | 1.0% | 2.0% | 1.0% | 2.0% | 1.0% | 2.0% | 1.0% | 2.0% |

*1.5 g of 85% phosphoric acid solution diluted in 10 g of ethyl acetate

Preparation of Neat Adhesive Castings and DMA/DSC Characterization

The various polyester-urethane and polyester-urethane/ET-polyester blend systems are cured with aliphatic isocyanate curing agent (MOR-FREE™ 200C) at various mix ratios. The adhesive samples are prepared by taking about 15 grams of the polyester-urethane and polyester-urethane/epoxy-terminated polyester compound blend mixture and mixing it with the aliphatic isocyanate curing agent at various mix ratios in a bottle. The adhesive mixture is mixed for approximately 15 to 30 minutes and then is poured into a polymethylpentene petri dish. The solvent is allowed to evaporate overnight in a fume hood on a level surface, and then the adhesive samples are placed in a convection oven and cured for 7 days at 45° C. The adhesive samples are analyzed via DMA (TA Instruments Q800) using the Multi-Frequency-Strain Mode. A single applied frequency of 1 Hz from −100° C. to 150° C., with a heating rate of 3° C./min with an applied strain of 0.01% and a Preload force of 0.01 N, is used.

Glass transition temperatures ($T_g$) are determined using the DSC Q100 with auto sampler and RCS interfaced with a desktop computer using TA Advantage for Q series software. About 10 mg of sample is placed into a t-zero pan with an aluminum hermetic lid. The samples are run using the following conditions:

Initial Heat: 80° C. for 5 minutes.
Initial Heat: −85° C.×10° C./min=>200° C.
Cooling Cycle: 200° C.×10° C./min=>−85° C.
$2^{nd}$ Heat: −85° C.×10° C./min=>240° C.; return to room temperature.

$T_g$ via DSC is reported for the second heat cycle.

Critical properties of the samples analyzed were summarized in Table 9. A homogeneous polymer network with well-maintained mechanical properties was formed with introduction of epoxy-terminated-polyester to the system. The Storage Modulus of the cured neat polyester-urethane-polyurethane with and without the epoxy-terminated polyester additive will be in the range of about 50 to 1,500 MPa at 0° C. and 0.7 to 6.0 MPa at 25° C. and 0.10 to 1.50 MPa at 60° C.

TABLE 9

DMA characterization results

| Example No. | Adhesive Formula | Tg (° C.) | Storage Modulus @ 0° C. (MPa) | Storage Modulus @ 25° C. (MPa) | Storage Modulus @ 60° C. (MPa) |
| --- | --- | --- | --- | --- | --- |
| Comparative Example 1 | ADCOTE™ 811 A EA: MF 200C (100:4.5) | 4.33 | 515 | 2.67 | 0.62 |
| Comparative Example 2 | ADCOTE™ 811 A EA: MF 200C (100:6.0) | 4.71 | 929 | 4.12 | 1.02 |
| Example 33 | Example 17: MF 200C (100:4.5) | 2.67 | 873 | 2.70 | 0.41 |
| Example 34 | Example 17: MF 200C (100:6.0) | 0.60 | 542 | 3.73 | 0.86 |
| Example 35 | Example 18: MF 200C (100:4.5) | 1.72 | 722 | 2.72 | 0.47 |
| Example 36 | Example 18: MF 200C (100:6.0) | 1.83 | 592 | 3.37 | 0.79 |
| Example 37 | Example 19: MF 200C (100:4.5) | 3.92 | 344 | 2.69 | 0.52 |
| Example 38 | Example 19: MF 200C (100:6.0) | 3.63 | 339 | 3.76 | 0.88 |
| Example 39 | Example 20: MF 200C (100:4.5) | 3.64 | 229 | 2.56 | 0.37 |
| Example 40 | Example 20: MF 200C (100:6.0) | 4.40 | 245 | 3.47 | 0.81 |
| Example 41 | Example 21: MF 200C (100:4.5) | 3.78 | 615 | 2.55 | 0.46 |
| Example 42 | Example 21: MF 200C (100:6.0) | 4.16 | 449 | 3.09 | 0.75 |
| Example 43 | Example 22: MF 200C (100:4.5) | 4.20 | 684 | 3.21 | 0.39 |
| Example 44 | Example 22: MF 200C (100:6.0) | 4.55 | 903 | 4.04 | 0.91 |
| Example 45 | Example 23: MF 200C (100:4.5) | 3.16 | 391 | 2.83 | 0.49 |
| Example 46 | Example 23: MF 200C (100:6.0) | 4.06 | 806 | 3.88 | 0.86 |
| Example 47 | Example 24: MF 200C (100:4.5) | 4.45 | 533 | 2.35 | 0.27 |
| Example 48 | Example 24: MF 200C (100:6.0) | 4.44 | 495 | 2.61 | 0.54 |
| Example 49 | Example 25: MF 200C (100:4.5) | 3.16 | 303 | 2.19 | 0.25 |
| Example 50 | Example 25: MF 200C (100:6.0) | 4.48 | 313 | 2.77 | 0.58 |
| Example 51 | Example 26: MF 200C (100:4.5) | 3.94 | 395 | 2.08 | 0.28 |
| Example 52 | Example 26: MF 200C (100:6.0) | 4.88 | 540 | 2.85 | 0.68 |

TABLE 9-continued

DMA characterization results

| Example No. | Adhesive Formula | Tg (° C.) | Storage Modulus @ 0° C. (MPa) | Storage Modulus @ 25° C. (MPa) | Storage Modulus @ 60° C. (MPa) |
|---|---|---|---|---|---|
| Example 53 | Example 27: MF 200C (100:4.5) | 1.37 | 124 | 2.27 | 0.31 |
| Example 54 | Example 27: MF 200C (100:6.0) | 0.63 | 213 | 3.02 | 0.72 |
| Example 55 | Example 28: MF 200C (100:4.5) | 1.22 | 223 | 1.86 | 0.39 |
| Example 56 | Example 28: MF 200C (100:6.0) | 2.79 | 305 | 3.60 | 0.70 |
| Example 57 | Example 29: MF 200C (100:4.5) | 0.93 | 110 | 2.21 | 0.28 |
| Example 58 | Example 29: MF 200C (100:6.0) | 2.24 | 157 | 2.55 | 0.61 |
| Example 59 | Example 30: MF 200C (100:4.5) | −0.16 | 205 | 2.12 | 0.25 |
| Example 60 | Example 30: MF 200C (100:6.0) | 0.63 | 341 | 2.80 | 0.53 |
| Example 61 | Example 31: MF 200C (100:4.5) | 0.71 | 194 | 2.34 | 0.33 |
| Example 62 | Example 31: MF 200C (100:6.0) | 1.29 | 463 | 3.50 | 0.78 |
| Example 63 | Example 32: MF 200C (100:4.5) | 0.92 | 429 | 2.61 | 0.33 |
| Example 64 | Example 32: MF 200C (100:6.0) | 0.82 | 313 | 2.82 | 0.65 |

Adhesive Lamination Studies

The various polyester-urethane and polyester-urethane/epoxy-terminated polyester compound blends are cured with an aliphatic isocyanate curing agent at various mix ratios. The adhesive solution is mixed for approximately 15 to 30 minutes and then coated onto Prelam film with a Mayer rod to yield a coating weight of 4.48 to 4.88 g/m² (2.75 to 3.00 lbs/ream), and then laminated to 2 mil Cast Polypropylene film or coated onto 1.5 Gauge foil with a Mayer rod to yield a coating weight of 4.48 to 4.88 g/m² (2.75 to 3.00 lbs/ream), and then laminated to 1 mil Cast Polypropylene film using a nip temperature of 82° C. The laminates are then cured in a convection oven at 45° C. for 14 days.

Adhesion bond strengths are determined on a 15 mm wide strip of laminate (Prealm/CPP) on a Thwing-Albert Tensile Tester (Model QC-3A) with a 50 Newton load cell at a 10.0 cm/minute rate. The following abbreviations are used to describe test results: "AS" is adhesive split, "FT" is film tear, "FS" is film stretch, "AT" is adhesive transfer, and "AF" is adhesive failure.

The drawability of the laminates is determined by examining the percent elongation of the laminate (Foil/CPP) in the machine and transverse direction on laminate strip 25.4 mm×175 mm utilizing an Instron Tensile Tester. The test conditions for the Instron Tensile Tester are: fixture gap 7.62 cm, Load Cell 0-50 Newton's, rate of extension (head speed) 5.08 cm/min, elongation at Break (%) was recorded.

Bond strength and % elongation are summarized in Table 10. The critical performance difference will be in the % elongation observed for the laminate structure as a function of orientation. The % elongation in the machine and transverse direction will be more balanced in both directions being in the range of 6.5 to 10.5% and difference in the machine and transverse direction will be on the order of an absolute value of 0.0 to 0.60%, preferably 0.0 to 0.30%, due to the ability of the epoxy-terminated polyester to interact with the surface of the substrates and help balance the difference in distribution of forces across the laminate structure.

TABLE 10

Summary of bond strength on Prelam/CPP

| Example | | Bond strength (N/15 mm)[a] | | | | % Elongation[b] | |
|---|---|---|---|---|---|---|---|
| No. | Adhesive formulation | Green bond | 1 day | 7 days | 14 days | Trans | Mach |
| Comparative Example 3 | ADCOTE ™ 811 A EA: MF 200C (100:4.5) | 3.37, AF | 6.19, AT | 5.99, AT | 7.24, AT | 7.68 | 8.76 |
| Comparative Example 4 | ADCOTE ™ 811 A EA: MF 200C (100:6.0) | 2.43, AF | 6.16, AT | 6.69, AT | 7.97, AT | 7.7 | 8.91 |
| Example 65 | Example 17: MF 200C (100:4.5) | 2.40, AS | 7.52, AT | 8.40, AT | 8.19, AT | 7.93 | 8.47 |
| Example 66 | Example 17: MF 200C (100:6.0) | 3.42, AS | 11.92, FS | 11.87, FS | 11.86, FS | 8.04 | 8.86 |

TABLE 10-continued

Summary of bond strength on Prelam/CPP

| Example No. | Adhesive formulation | Bond strength (N/15 mm)[a] | | | | % Elongation[b] | |
|---|---|---|---|---|---|---|---|
| | | Green bond | 1 day | 7 days | 14 days | Trans | Mach |
| Example 67 | Example 19: MF 200C (100:4.5) | 2.43, AF | 6.83, AT | 7.19, AT | 7.82, AT | 7.81 | 7.63 |
| Example 68 | Example 19: MF 200C (100:6.0) | 2.00, AF | 6.40, AT | 7.71, AT | 7.63, AT | 7.37 | 7.22 |
| Example 69 | Example 20: MF 200C (100:4.5) | 1.77, AF | 5.80, AT | 11.89, FS | 12.45, FS | 8.15 | 8.57 |
| Example 70 | Example 20: MF 200C (100:6.0) | 2.40, AF | 6.40, AT | 13.52, FS | 14.00, FS | 8.22 | 8.66 |
| Example 71 | Example 21: MF 200C (100:4.5) | 2.63, AF | 6.06, AT | 11.00, FS | 11.29, FS | 6.9 | 8.09 |
| Example 72 | Example 21: MF 200C (100:6.0) | 2.88, AF | 6.73, AT | 8.13, AT | 12.42, FS | 7.88 | 8.03 |
| Example 73 | Example 22: MF 200C (100:4.5) | 2.35, AF | 6.43, AT | 11.81, FS | 13.24, FS | 7.28 | 7.47 |
| Example 74 | Example 22: MF 200C (100:6.0) | 2.08, AF | 12.47, FS | 14.67, FS | 14.43, FS | 7.74 | 7.72 |
| Example 75 | Example 23: MF 200C (100:4.5) | 2.18, AF | 10.12, FS | 10.38, FS | 14.69, FS | 7.87 | 7.53 |
| Example 76 | Example 23: MF 200C (100:6.0) | 1.54, AF | 7.15, AT | 9.97, FS | 13.86, FS | 7.28 | 8.53 |
| Example 77 | Example 24: MF 200C (100:4.5) | 1.72, AF | 6.86, AT | 7.92, AT | 7.65, AT | 7.74 | 8.37 |
| Example 78 | Example 24: MF 200C (100:6.0) | 1.28, AF | 6.63, AT | 7.81, AT | 7.77, AT | 8.01 | 9.15 |
| Example 79 | Example 25: MF 200C (100:4.5) | 3.23, AF | 6.93, AT | 8.05, AT | 8.35, AT | 7.43 | 7.98 |
| Example 80 | Example 25: MF 200C (100:6.0) | 3.14, AF | 6.73, AT | 8.02, AT | 11.35, FS | 7.53 | 7.64 |
| Example 81 | Example 26: MF 200C (100:4.5) | 2.33, AF | 8.05, AT | 13.09, FS | 11.93, FS | 7.59 | 8.12 |
| Example 82 | Example 26: MF 200C (100:6.0) | 2.25, AF | 13.49, FS | 13.25, FS | 13.36, FS | 7.4 | 8.49 |
| Example 83 | Example 27: MF 200C (100:4.5) | 3.41, AT | 10.11, FS | 13.80, FS | 14.43, FS | 7.8 | 8.17 |
| Example 84 | Example 27: MF 200C (100:6.0) | 3.37, AT | 13.49, FS | 11.91, FS | 14.18, FS | 8.67 | 8.89 |
| Example 85 | Example 28: MF 200C (100:4.5) | 3.42, AT | 7.80, AT | 13.02, FS | 14.58, FS | 7.58 | 8.93 |
| Example 86 | Example 28: MF 200C (100:6.0) | 3.81, AS | 8.41, AT | 10.61, FS | 12.86, FS | 8.34 | 8.88 |
| Example 87 | Example 29: MF 200C (100:4.5) | 3.57, AT | 7.17, AT | 11.59, FS | 9.84, FS | 8.38 | 8.5 |
| Example 88 | Example 29: MF 200C (100:6.0) | 3.57, AT | 7.20, AT | 13.58, FS | 13.78, FS | 8.32 | 7.95 |
| Example 89 | Example 30: MF 200C (100:4.5) | 3.72, AS | 6.81, AT | 7.88, AT | 10.13, FS | 6.94 | 8.29 |
| Example 90 | Example 30: MF 200C (100:6.0) | 3.99, AS | 6.69, AT | 12.67, FS | 13.60, FS/FT | 8.17 | 7.83 |
| Example 91 | Example 31: MF 200C (100:4.5) | 3.84, AS | 13.37, FS | 13.64, FS | 14.62, FS | 7.58 | 8.07 |
| Example 92 | Example 31: MF 200C (100:6.0) | 2.89, AF | 12.03, FS | 13.30, FS | 11.22, FS | 8.02 | 8.4 |
| Example 93 | Example 32: MF 200C (100:4.5) | 2.47, AF | 7.03, AT | 12.03, FS | 12.66, FS | 7.88 | 8.31 |
| Example 94 | Example 32: MF 200C (100:6.0) | 2.47, AS | 13.03, FS | 12.90, FS | 13.21, FS | 7.88 | 8.38 |

[a]Laminating structure: Prelam/2 mil CPP
[b]Laminating structure: 1.5 Gauge foil/1 mil CPP, Trans: Transverse Direction, Mach: Machine Direction, laminate In addition to the embodiments described above and those set forth in the Examples, many examples of specific combinations are within the scope of the disclosure, some of which are described below:

Embodiment 1

A solvent-based adhesive composition, comprising:
(A) a polyester-urethane resin;
(B) an epoxy-terminated polyester compound;
(C) a phosphoric acid; and
(D) an aliphatic isocyanate curing agent.

Embodiment 2

The solvent-based adhesive composition of any preceding or succeeding claim, wherein the polyester-urethane resin is the reaction product of a polyester polyol and an isocyanate.

Embodiment 3

The solvent-based adhesive composition of any preceding or succeeding Embodiment, wherein the polyester-urethane resin accounts for from 65 to 99.5 percent by weight of the total weight of the polyester-urethane resin (A), the epoxy-terminated polyester compound (B), and the phosphoric acid (C).

Embodiment 4

The solvent-based adhesive composition of any preceding or succeeding Embodiment, wherein the polyester-urethane resin accounts for from 95 to 99 percent by weight of the total weight of the polyester-urethane resin (A), the epoxy-terminated polyester compound (B), and the phosphoric acid (C).

Embodiment 5

The solvent-based adhesive composition of any preceding or succeeding Embodiment, wherein the epoxy-terminated polyester compound accounts for from 0.5 to 35 percent by weight of the total weight of the polyester-urethane resin (A), the epoxy-terminated polyester compound (B), and the phosphoric acid (C).

Embodiment 6

The solvent-based adhesive composition of any preceding or succeeding Embodiment, wherein the epoxy-terminated polyester compound accounts for from 0.5 to 5 percent by weight of the total weight of the polyester-urethane resin (A), the epoxy-terminated polyester compound (B), and the phosphoric acid (C).

Embodiment 7

The solvent-based adhesive composition of any preceding or succeeding Embodiment, wherein the epoxy-terminated polyester compound has an epoxide equivalent weight of 275 to 3,500.

Embodiment 8

The solvent-based adhesive composition of any preceding or succeeding Embodiment, wherein the epoxy-terminated polyester compound has an epoxide equivalent weight of 350 to 2,500.

Embodiment 9

The solvent-based adhesive composition of any preceding or succeeding Embodiment, wherein the epoxy-terminated polyester compound has an epoxide equivalent weight of 400 to 2,000.

Embodiment 10

The solvent-based adhesive composition of any preceding or succeeding Embodiment, wherein the epoxy-terminated polyester compound has a number-average molecular weight of less than or equal to 8,000.

Embodiment 11

The solvent-based adhesive composition of any preceding or succeeding Embodiment, wherein the epoxy-terminated polyester compound has a number-average molecular weight of less than or equal to 6,000.

Embodiment 12

The solvent-based adhesive composition of any preceding or succeeding Embodiment, wherein the epoxy-terminated polyester compound has a number-average molecular weight of less than or equal to 3,500.

Embodiment 13

The solvent-based adhesive composition of any preceding or succeeding Embodiment, wherein the epoxy-terminated polyester compound is the product of reactants including a diepoxide and a carboxylic acid-terminated polyester.

Embodiment 14

The solvent-based adhesive composition of any preceding or succeeding Embodiment, wherein the stoichiometric ratio of epoxide groups in the diepoxide to carboxylic acid groups in the carboxylic acid-terminated polyester is from 1.3:1 to 3.1:1.

Embodiment 15

The solvent-based adhesive composition of any preceding or succeeding Embodiment, wherein the stoichiometric ratio of epoxide groups in the diepoxide to carboxylic acid groups in the carboxylic acid-terminated polyester is from 1.6:1 to 2.9:1.

Embodiment 16

The solvent-based adhesive composition of any preceding or succeeding Embodiment, wherein the stoichiometric ratio of epoxide groups in the diepoxide to carboxylic acid groups in the carboxylic acid-terminated polyester is from 2:1 to 2.7:1.

Embodiment 17

The solvent-based adhesive composition of any preceding or succeeding Embodiment, wherein the carboxylic-acid terminated polyester is the product of reactants including a diol and a (di)carboxylic acid.

Embodiment 18

The solvent-based adhesive composition of any preceding or succeeding Embodiment, wherein the carboxylic-acid terminated polyester has an acid value of 110 to 260.

Embodiment 19

The solvent-based adhesive composition of any preceding or succeeding Embodiment, wherein the carboxylic-acid terminated polyester has an acid value of 120 to 200.

Embodiment 20

The solvent-based adhesive composition of any preceding or succeeding Embodiment, wherein the carboxylic-acid terminated polyester has an acid value of 125 to 175.

Embodiment 21

The solvent-based adhesive composition of any preceding or succeeding Embodiment, wherein the carboxylic-acid terminated polyester has molecular weight of from 430 to 1,020.

Embodiment 22

The solvent-based adhesive composition of any preceding or succeeding Embodiment, wherein the carboxylic-acid terminated polyester has molecular weight of from 560 to 940.

Embodiment 23

The solvent-based adhesive composition of any preceding or succeeding Embodiment, wherein the carboxylic-acid terminated polyester has molecular weight of from 640 to 900.

Embodiment 24

The solvent-based adhesive composition of any preceding or succeeding Embodiment, wherein the epoxy-terminated polyester compound has the structure (I):

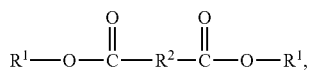

wherein $R^1$— has the structure (II):

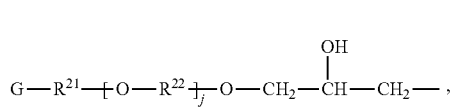

wherein G- has the structure (III):

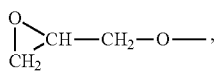

and wherein j is 0 to 5, —$R^2$— is a divalent organic group, —$R^{21}$— is a divalent alkyl group, and —$R^{22}$— is a divalent alkyl group.

Embodiment 25

The solvent-based adhesive composition of any preceding or succeeding Embodiment, wherein the phosphoric acid accounts for from 0.01 to 0.4 percent by weight of the total weight of the polyester-urethane resin (A), the epoxy-terminated polyester compound (B), and the phosphoric acid (C).

Embodiment 26

The solvent-based adhesive composition of any preceding or succeeding Embodiment, wherein the phosphoric acid accounts for from 0.01 to 0.05 percent by weight of the total weight of the polyester-urethane resin (A), the epoxy-terminated polyester compound (B), and the phosphoric acid (C).

Embodiment 27

The solvent-based adhesive composition of any preceding or succeeding Embodiment, further comprising a solvent.

Embodiment 28

The solvent-based adhesive composition of any preceding or succeeding Embodiment, wherein the solvent is selected from the group consisting of ethyl acetate, methyl ethyl ketone, methyl acetate, and combinations thereof.

Embodiment 29

A method for preparing a solvent-based adhesive composition, the method comprising:
  providing a polyester-urethane resin;
  providing an epoxy-terminated polyester compound;
  mixing the polyester-urethane resin, epoxy-terminated polyester compound, and phosphoric acid to form a resin mixture;
  diluting the resin mixture in a solvent to form a diluted resin mixture having a solid content from 25 to 55 weight percent, based on the total weight of the diluted resin mixture; and
  curing the diluted resin mixture with an aliphatic isocyanate curing agent at a mix ratio (parts by weight resin mixture before dilution:parts by weight aliphatic isocyanate curing agent) of from 100:1 to 100:12.

Embodiment 30

The method for preparing a solvent-based adhesive composition of any preceding or succeeding Embodiment, wherein the diluted resin mixture has a solid content from 35 to 40 weight percent, based on the total weight of the diluted resin mixture Embodiment 31. The method for preparing a solvent-based adhesive composition of any preceding or succeeding Embodiment, wherein the mix ratio (parts by weight resin:parts by weight aliphatic isocyanate curing agent) is from 100:4 to 100:10.

Embodiment 32

A laminate structure comprising the adhesive composition of any preceding or succeeding Embodiment.

Embodiment 33

The laminate structure according to any preceding or succeeding Embodiment, further comprising a metal substrate.

Embodiment 34

The laminate structure according to any preceding or succeeding Embodiment, further comprising a polyolefin substrate.

What is claimed is:
1. A solvent-based adhesive composition, comprising:
  (A) a polyester-urethane resin;
  (B) an epoxy-terminated polyester compound;

(C) a phosphoric acid; and
(D) an aliphatic isocyanate curing agent,
wherein the polyester-urethane resin accounts for from 65 to 99.5 percent by weight of the total weight of the polyester-urethane resin (A), the epoxy-terminated polyester compound (B), and the phosphoric acid (C).

2. The solvent-based adhesive composition of claim 1, wherein the polyester-urethane resin is the reaction product of a polyester polyol and an isocyanate.

3. The solvent-based adhesive composition of claim 1, wherein the polyester-urethane resin accounts for from 95 to 99 percent by weight of the total weight of the polyester-urethane resin (A), the epoxy-terminated polyester compound (B), and the phosphoric acid (C).

4. A solvent-based adhesive composition comprising,
(A) a polyester-urethane resin;
(B) an epoxy-terminated polyester compound;
(C) a phosphoric acid; and
(D) an aliphatic isocyanate curing agent;
wherein the epoxy-terminated polyester compound accounts for from 0.5 to 35 percent by weight of the total weight of the polyester-urethane resin (A), the epoxy-terminated polyester compound (B), and the phosphoric acid (C).

5. The solvent-based adhesive composition of claim 1, wherein the epoxy-terminated polyester compound accounts for from 0.5 to 5 percent by weight of the total weight of the polyester-urethane resin (A), the epoxy-terminated polyester compound (B), and the phosphoric acid (C).

6. The solvent-based adhesive composition of claim 1, wherein the epoxy-terminated polyester compound has the structure (I):

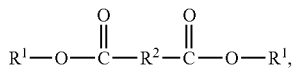

wherein $R^1$— has the structure (II):

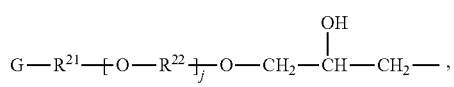

wherein G- has the structure (III):

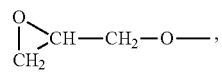

and
wherein j is 0 to 5, —$R^2$— is a divalent organic group, —$R^{21}$— is a divalent alkyl group, and —$R^{22}$— is a divalent alkyl group.

7. The solvent-based adhesive composition of claim 1, wherein the phosphoric acid accounts for from 0.01 to 0.4 percent by weight of the total weight of the polyester-urethane resin (A), the epoxy-terminated polyester compound (B), and the phosphoric acid (C).

8. The solvent-based adhesive composition of claim 1, wherein the phosphoric acid accounts for from 0.01 to 0.05 percent by weight of the total weight of the polyester-urethane resin (A), the epoxy-terminated polyester compound (B), and the phosphoric acid (C).

9. The solvent-based adhesive composition of claim 1, further comprising a solvent.

10. The solvent-based adhesive composition of claim 9, wherein the solvent is selected from the group consisting of ethyl acetate, methyl ethyl ketone, methyl acetate, and combinations thereof.

11. The solvent-based adhesive composition of claim 4, wherein the polyester-urethane resin is the reaction product of a polyester polyol and an isocyanate.

12. The solvent-based adhesive composition of claim 4, wherein the polyester-urethane resin accounts for from 95 to 99 percent by weight of the total weight of the polyester-urethane resin (A), the epoxy-terminated polyester compound (B), and the phosphoric acid (C).

13. The solvent-based adhesive composition of claim 4, wherein the epoxy-terminated polyester compound accounts for from 0.5 to 5 percent by weight of the total weight of the polyester-urethane resin (A), the epoxy-terminated polyester compound (B), and the phosphoric acid (C).

14. The solvent-based adhesive composition of claim 4, wherein the epoxy-terminated polyester compound has the structure (I):

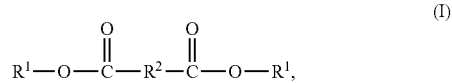

wherein $R^1$— has the structure (II):

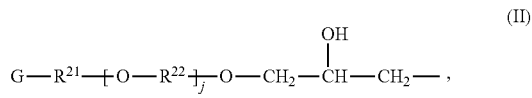

wherein G- has the structure (III):

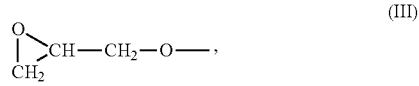

and
wherein j is 0 to 5, —$R^2$— is a divalent organic group, —$R^{21}$— is a divalent alkyl group, and —$R^{22}$— is a divalent alkyl group.

15. The solvent-based adhesive composition of claim 4, wherein the phosphoric acid accounts for from 0.01 to 0.4 percent by weight of the total weight of the polyester-urethane resin (A), the epoxy-terminated polyester compound (B), and the phosphoric acid (C).

16. The solvent-based adhesive composition of claim 4, wherein the phosphoric acid accounts for from 0.01 to 0.05 percent by weight of the total weight of the polyester-urethane resin (A), the epoxy-terminated polyester compound (B), and the phosphoric acid (C).

17. The solvent-based adhesive composition of claim 4, further comprising a solvent.

18. The solvent-based adhesive composition of claim 17, wherein the solvent is selected from the group consisting of ethyl acetate, methyl ethyl ketone, methyl acetate, and combinations thereof.

* * * * *